US007336572B1

(12) United States Patent
Lee

(10) Patent No.: US 7,336,572 B1
(45) Date of Patent: Feb. 26, 2008

(54) DETECTING SYNC PATTERNS FOR OPTICAL MEDIA

(75) Inventor: Wooi Kean Lee, Broomfield, CO (US)

(73) Assignee: Marvell International Ltd., Hamilton (BM)

( * ) Notice: Subject to any disclaimer, the term of this patent is extended or adjusted under 35 U.S.C. 154(b) by 599 days.

(21) Appl. No.: 10/921,526

(22) Filed: Aug. 19, 2004

(51) Int. Cl.
G11B 7/00 (2006.01)

(52) U.S. Cl. .............................. 369/47.27; 369/275.3; 369/59.23

(58) Field of Classification Search ............. 369/275.3, 369/47.26, 47.27, 59.22, 59.23, 47.48, 47.21
See application file for complete search history.

(56) References Cited

U.S. PATENT DOCUMENTS 6,536,011 B1 * 3/2003 Jang et al. .................. 714/814

OTHER PUBLICATIONS

Standard ECMA-130 2nd Edition-Jun. 1996; ECMA Standardizing Information and Communication Systems; Data Interchange on Read-Only 120 mm Optical Data Disks (CD-ROM); pp. 1-47.

Standard ECMA-267 34d Edition-Apr. 2001; ECMA Standardizing Information and Communication Systems; 120 mm DVD-Read-Only Disk; pp. 1-85.

ECMA International Standard ECMA-337 2nd Edition-Dec. 2003; Data Interchange on 120 mm and 80 mm Optical Disk Using +RW Format—Capacity: 4,7 and 1,46 Gbytes per side (Recoding speed up to 4X); pp. 1-121.

Standard ECMA-338 Dec. 2002; ECMA Standardizing Information and Communication Systems; 80 mm (1,46 Gbytes perside) and 120 mm (4,70 Gbytes per side) DVD Re-recordable Disk (DVD-RW); pp. 1-150.

* cited by examiner

Primary Examiner—Nabil Hindi

(57) ABSTRACT

A sync finder module for an optical medium playback device that generates a bit stream including sync patterns and data blocks comprises a pulse jitter detect module that receives the sync pattern, which includes a plurality of transitions each having a desired position in the sync pattern, that selects actual N-bit segments of the sync pattern at the desired positions and that compares the actual N-bit segments to at least one expected N-bit segment. A pulse verifying module communicates with the pulse jitter detect module and generates a verified signal if the expected N-bit segments match the actual N-bit segments.

38 Claims, 6 Drawing Sheets

DETECTING SYNC PATTERNS FOR OPTICAL MEDIA

FIELD OF THE INVENTION

The present invention relates to optical media playback devices, and more particularly to sync pattern detection in optical media playback devices.

BACKGROUND OF THE INVENTION

Optical media such as compact discs (CDs) and digital versatile discs (DVDs) store data that is read back optically. CDs typically include a substrate that is made of plastic. For pre-recorded CDs, the substrate may be impressed during manufacturing with microscopic bumps that are arranged as a continuous spiral track of data. The bumps correspond to pits (from the opposite side) and lands are located between adjacent pits. A layer such as aluminum may be formed on the substrate to cover the bumps. A protective layer such as an acrylic may also be applied over the aluminum layer.

A DVD typically includes several layers. For pre-recorded DVDs, each layer may be impressed during manufacturing with microscopic bumps that are arranged as a spiral track of data. A reflective layer such as aluminum may be applied to the substrate to cover the bumps. A semi-reflective layer such as gold may be used for the outer layers. The semi-reflective layer allows the laser pass through onto the inner layers. The layers are coated with lacquer, aligned, laminated and cured.

During read back, the CD and/or DVD is rotated by the optical media playback device, which typically includes (amongst other things) a laser, a spindle motor and an optical sensor. The spindle motor rotates the optical medium. The laser is directed onto the tracks of the optical medium and the optical sensor measures reflected light. When the optical sensor generates a high current level corresponding to high reflectivity, the data may be interpreted as a "1" (or "0"). When the optical sensor generates a low current level corresponding to low reflectivity, the data may be interpreted as a "0" (or "1"). In some devices, the land/pit signal, or commonly described as converted non-return to zero inverted (NRZI) signal may be converted to a non-return to zero (NRZ) signal, as shown in FIG. 1, where 1's represent transitions and 0's represent the absence of transitions.

The data that is stored on the CD and/or DVD typically includes alternating sync patterns and data blocks. The sync patterns are used to identify the data blocks. In other words, the optical media playback device must be able to identify the location of the sync patterns so that the corresponding data block can be read properly. The optical media playback device also typically includes a sync detector module that is used to identify the sync patterns.

Defect errors may occur due to scratches, dirt and/or other materials on the optical media. Defect errors may alter the reflectivity of the laser light, which adversely impacts the NRZI converted signal that is generated by the optical sensor. As a result, the NRZI converted signal may include errors. In some situations, the defect errors may cause the sync detector circuit to fail to detect a sync pattern, which may cause the corresponding data block to be lost.

The optical media playback device also includes a timing circuit that generates timing signals for the sync detector circuit. When timing errors occur, transitions in the NRZI converted signal for a sync pattern and/or data will shift left or right from time to time. This kind of shifting pattern will make it more difficult to identify a proper sync pattern. In some circumstances, a faulty sync pattern may be created that looks very similar to a sync pattern carrying defect errors.

SUMMARY OF THE INVENTION

A sync finder module for an optical medium playback device that generates a bit stream including sync patterns and data blocks comprises a pulse jitter detect module that receives the sync pattern, which includes a plurality of transitions each having a desired position in the sync pattern, that selects actual N-bit segments of the sync pattern at the desired positions and that compares the actual N-bit segments to at least one expected N-bit segment. A pulse verifying module communicates with the pulse jitter detect module and generates a verified signal if the expected N-bit segments match the actual N-bit segments.

In other features, N is greater than one. The sync finder module verifies the sync pattern based in part on the verified signal. The pulse jitter detect module generates a second signal when remaining ones of the bits in the sync pattern are not transitions. The sync finder module verifies the sync pattern of the bit stream when the verified signal and the second signal are high have a first state.

In still other features, N is equal to 3. The at least one expected N-bit segment is programmable. The at least one expected N-bit segment is equal to 010. The bit stream is in nonreturn to zero inverted (NRZi) format. The pulse jitter detect module generates a timing error signal based on the comparison.

A system comprises the sync finder module and further comprises a timing module that generates a timing signal for the sync finder module. The timing module alters the timing signal based on the timing error signal.

In still other features, the pulse jitter detect module generates a defect signal based on the comparison.

An optical media playback device comprises the sync finder module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
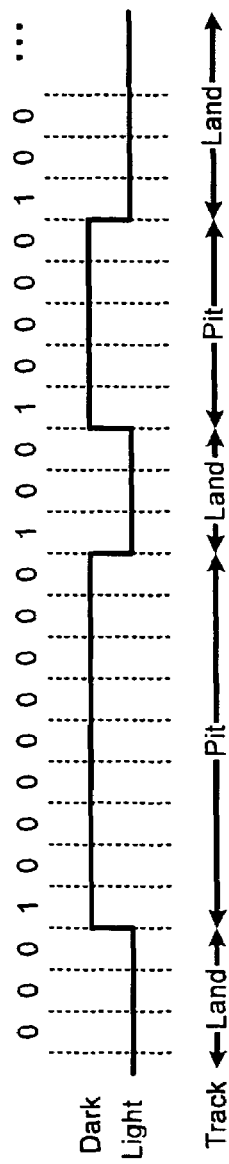
FIG. 1 illustrates exemplary land/pit and corresponding NRZI converted signals that are generated by an optical playback device reading an optical medium.
Figure 2:
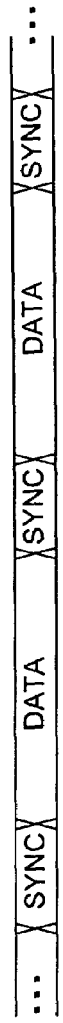
FIG. 2 illustrates exemplary alternating sync patterns and data blocks.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 3:
FIG. 3 illustrates exemplary sync identification (ID) and sync common fields of an exemplary sync pattern for a DVD.
Figure 4:
FIG. 4 illustrates an exemplary sync pattern for a CD.

Referring now to FIGS. 3 and 4, for DVDs that are compliant with European Computer Manufacturers Association (ECMA)-267 (for DVD-Read-Only), ECMA-337 (DVD+RW) and ECMA-338 (DVD-RW) (which are hereby incorporated herein by reference), the sync pattern includes 32 bits. There are 10 sync identification (ID) bits, which may vary depending upon the application, and 22 sync common bits, which do not vary. For example, the 10 bits may have 8 ID's and four states for a total of 32 variations. The sync common bits may be 0100010000000000000100 (in NRZ converted), although other bit combinations can be used. For CDs that are compliant with ECMA-130 (which is hereby incorporated herein by reference), however, the sync patterns include 24 bits that are common to all CD sync patterns. For example, the 24 bits may be 100000000001000000000010 (in NRZ converted), although other bit combinations may be used. Skilled artisans will appreciate that the present invention is not limited to the ECMA standards, to the number of bits in the sync pattern, and/or the value of bits in the sync pattern described above.

Figure 5:
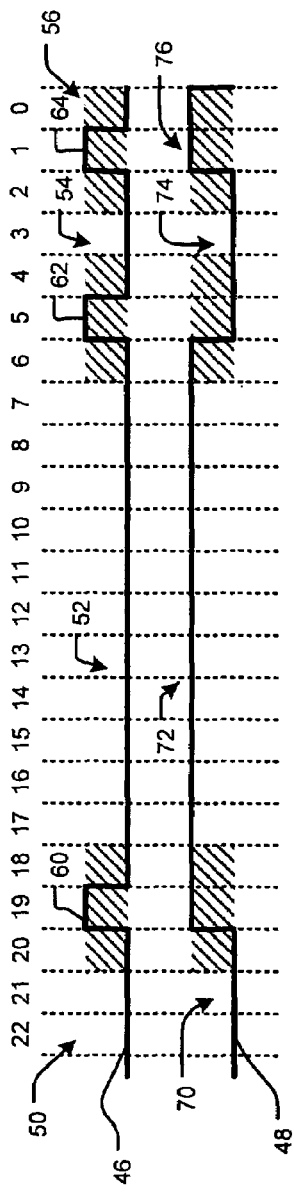
FIG. 5 illustrates exemplary NRZ converted and NRZI converted signals for a common field of a DVD sync pattern.

Referring now to FIG. 5, NRZ converted and NRZI converted signals 46 and 48, respectively, for a sync common field of a DVD sync pattern are shown. The NRZ converted signal has first, second, third and fourth low segments 50, 52, 54, and 56, respectively, that are separated by first, second and third high segments 60, 62 and 64, respectively. In this exemplary embodiment, the first low segment 50 should be 3 bits in duration, the second low segment 52 should be 13 bits in duration, the third low segment 54 should be 3 bits in duration and the fourth low segment 56 should be at least 1 bit in duration.

The NRZI converted signal 48 has a first low segment 70, a second high segment 72, a third low segment 74 and a fourth high segment 76. The first low segment 70 should be 3 bits in duration, the second high segment 72 should be 14 bits in duration, the third low segment 74 should be 4 bits in duration and the fourth high segment 76 should be 1 bit in duration.

The following table summarizes bit error patterns for left, right and mid edge shifts for actual NRZI converted signals received by the sync finder module described below. As can be seen below, a left edge shift occurs when the first high segment 60 moves either left or right.

| Edge Shift | Low | High | Low | High | Description |
|---|---|---|---|---|---|
| None | 3 | 14 | 4 | 1 | None |
| Left | 2 | 15 | 4 | 1 | 2 bit/1 edge jitter |
| Left | 4 | 13 | 4 | 1 | 2 bit/1 edge jitter |
| Right | 3 | 14 | 3 | 2 | 2 bit/1 edge jitter |
| Right | 3 | 14 | 5 | 0 | 2 bit/1 edge jitter |
| Mid | 3 | 13 | 5 | 1 | 2 bit/1 edge jitter |
| Mid | 3 | 15 | 3 | 1 | 2 bit/1 edge jitter |

Therefore, the most likely DVD sync patterns that occur due to timing errors have been identified by 2 bit/1 edge jitter as shown in the table above. All other errors can be categorized as disc defect errors.

Figure 6:
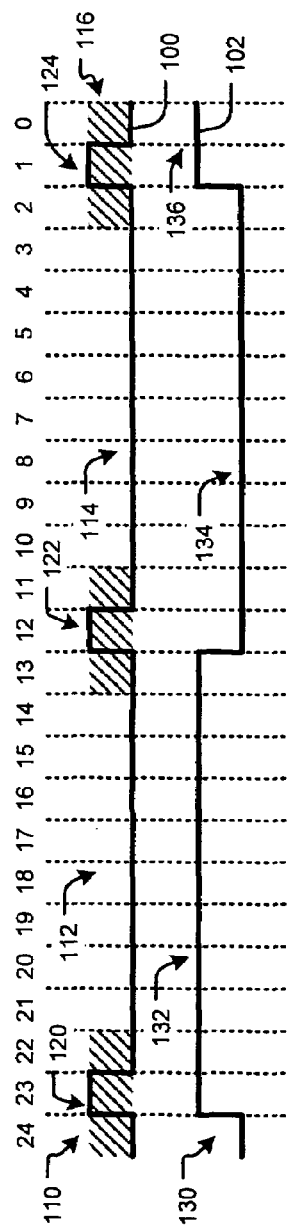
FIG. 6 illustrates exemplary NRZ converted and NRZI converted signals from a CD sync pattern.

Referring now to FIG. 6, NRZ converted and NRZI converted signals 100 and 102, respectively, from a CD sync pattern are shown. The NRZ converted signal 100 has first, second, third and fourth low segments 110, 112, 114 and 116, respectively, that are separated by first, second and third high segments 120, 122, and 124, respectively. The first low segment 110 should be 1 bit in duration, the second low segment 112 should be 10 bits in duration, the third low segment 114 should be 10 bits in duration and the fourth low segment 116 should be at least 1 bit in duration.

The NRZI converted signal 102 has a first low segment 130, a second high segment 132, a third low segment 134 and a fourth high segment 136. The first low segment 130 should be 1 bit in duration, the second high segment 132 should be 11 bits in duration, the third low segment 134 should be 11 bits in duration and the fourth high segment 136 should be 2 bits in duration.

The following table summarizes bit error patterns for left, right and mid edge shifts for actual NRZI converted signals received by the sync finder module.

| Edge Shift | High | Low | High | Comment |
|---|---|---|---|---|
| None | 11 | 11 | 2 | None |
| Left | 10 | 11 | 2 | 2 bit/1 edge jitter |
| Left | 12 | 11 | 2 | 2 bit/1 edge jitter |
| Right | 11 | 10 | 3 | 2 bit/1 edge jitter |
| Right | 11 | 12 | 1 | 2 bit/1 edge jitter |
| Right | 11 | 11 | 1 | 1 bit/bit-error |
| Mid | 10 | 12 | 2 | 2 bit/1 edge jitter |
| Mid | 12 | 10 | 2 | 2 bit/1 edge jitter |

Therefore, the most likely CD sync patterns that are caused by timing errors have been identified by 2 bit/1 edge jitter as shown in the table above. All other errors can be categorized as disc defect errors.

Figure 7A:
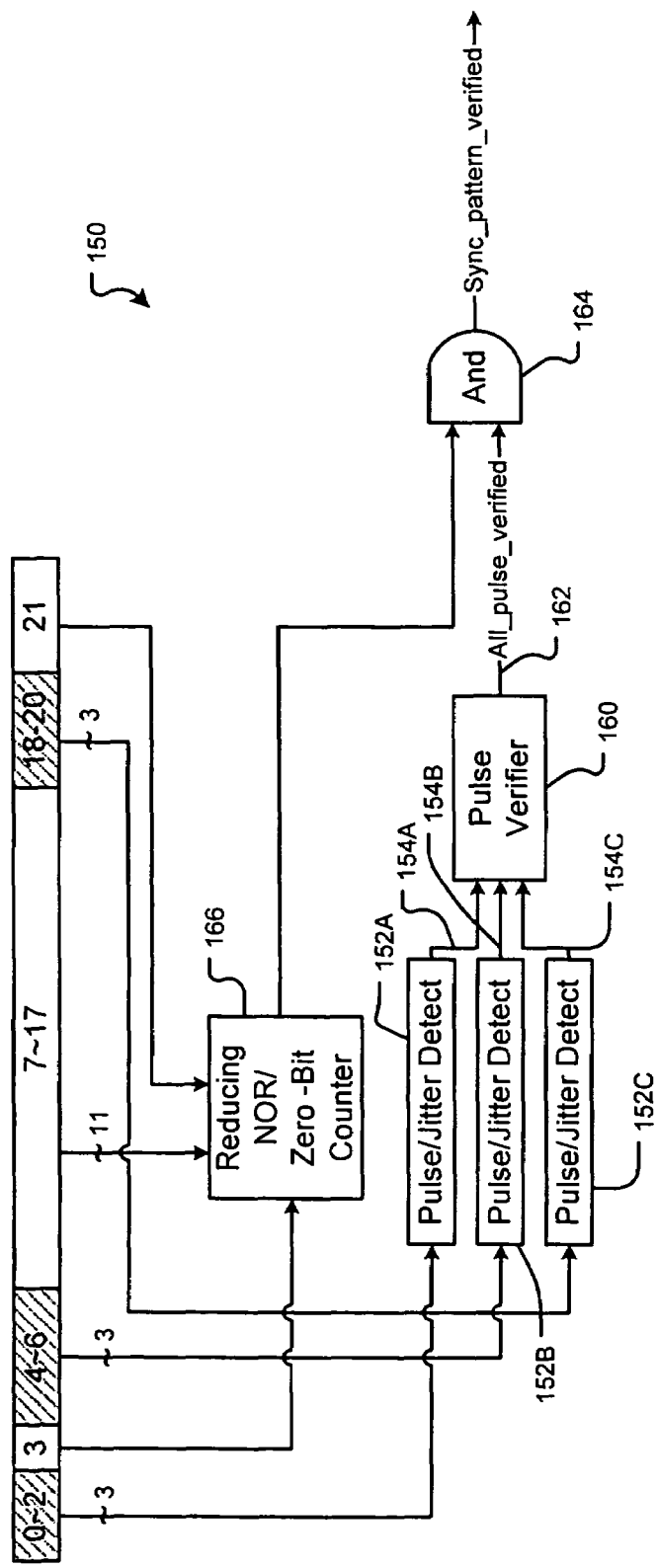
FIGS. 7A and 7B are a functional block diagrams of a sync finder module according to an exemplary embodiment for DVD and CD media.
Figure 7B:
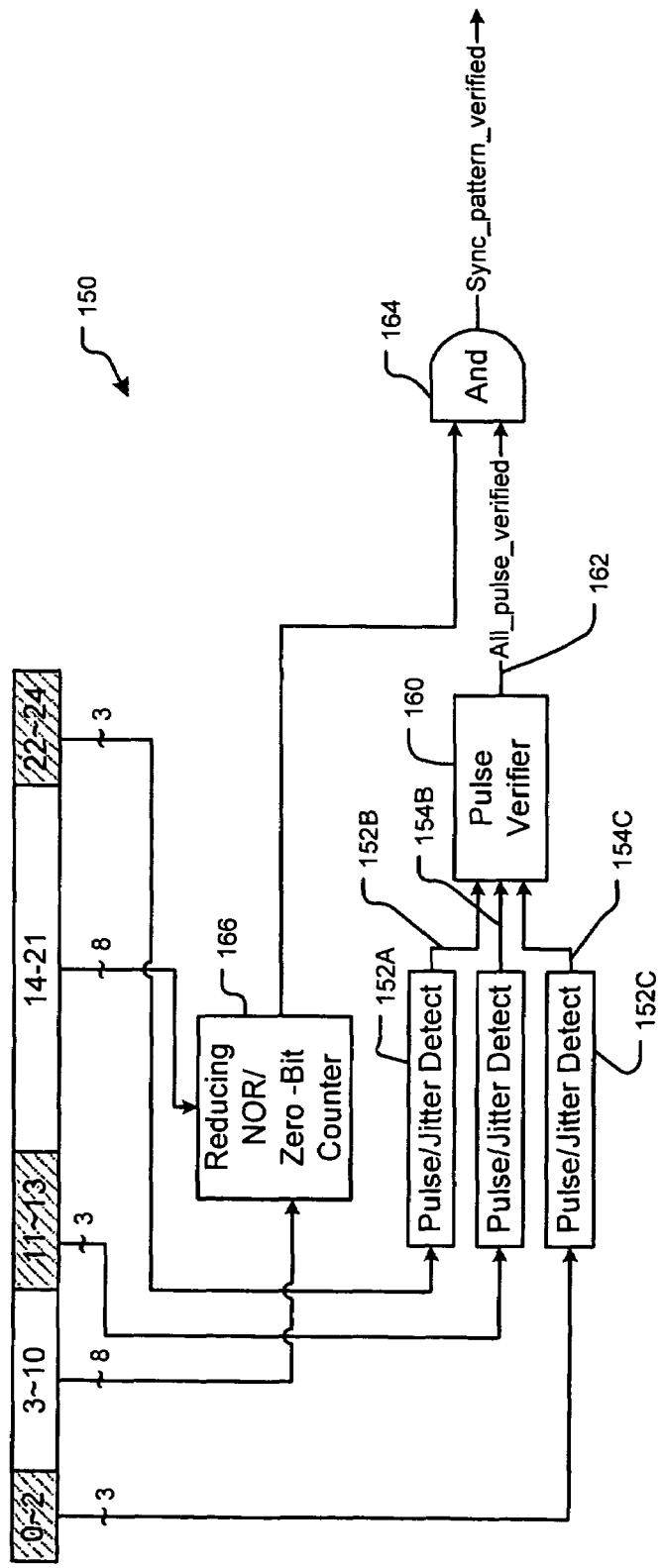

Referring now to FIGS. 7A and 7B, a functional block diagram of an exemplary sync finder module 150 according to an embodiment of the invention is shown. The sync finder module 150 includes pulse jitter detector modules 152A, 152B, and 152C (collectively 152) that detect pulse jitter and that generate edge match/mismatch signals 154A, 154B and 154C (collectively 154). When the exemplary data from FIG. 5 is used, the first pulse jitter detector module 152A receives bit positions 0-2, the second pulse jitter detector module 152B receives bit positions 4-6, the third pulse jitter detector module receives bit positions 18-20.

When the exemplary data from FIG. 6 is used, the first pulse jitter detector module 152A receives bit positions 0-2, the second pulse jitter detector module 152B receives bit positions 11-13, and the third pulse jitter detector module 152C receives bit positions 22-24. Skilled artisans will appreciate that additional and/or fewer pulse jitter detector modules may be used and/or the pulses may be located at other bit positions in the sync pattern. In one embodiment, the expected bits that are compared to the actual received bits by the pulse jitter detector modules are programmable. In another embodiment, each pulse jitter detector module includes a programmable bit selector that selects N adjacent bits in the sync pattern.

A pulse verifier 160 receives the edge match/mismatch signals 154 and generates an all_pulse_verified signal 162 that is high when all edges match. The pulse verifier 160 may include a register or other data storage that is set to 0 when there is no allowable edge jitter, 1 when there is 1 allowable edge jitter, 2 when there is 2 allowable edge jitter, etc. The register or other data storage may be polled by the optical media playback device. The all_pulse verified signal is output to one input of an AND gate 164.

For the exemplary data of FIG. 5, a reducing NOR gate or zero-bit counter 166 receives the contents of bit positions 3, 7-17 and 21-22. For the exemplary data of FIG. 6, the reducing NOR gate or zero-bit counter receives bit positions 3-10 and 14-21. The reducing NOR gate or zero-bit counter may be implemented by a module with programmable bit selection for detecting various types of disc defect errors. These bit positions should have a value of 0. If all of these bit positions are zero or the sum of zero-bit counter (which is used to count the total bit positions that have a value of 0) is greater than the programmable selection, the reducing NOR gate or ZERO Counter 166 outputs 1 to another input of the AND gate 164. If the all_pulse_verified signal 162 and the output of the reducing NOR gate 166 are both 1, the AND gate 164 generates a sync_pattern_verified signal that is equal to 1, otherwise the sync_pattern_verified signal is equal to 0.

Figure 8:
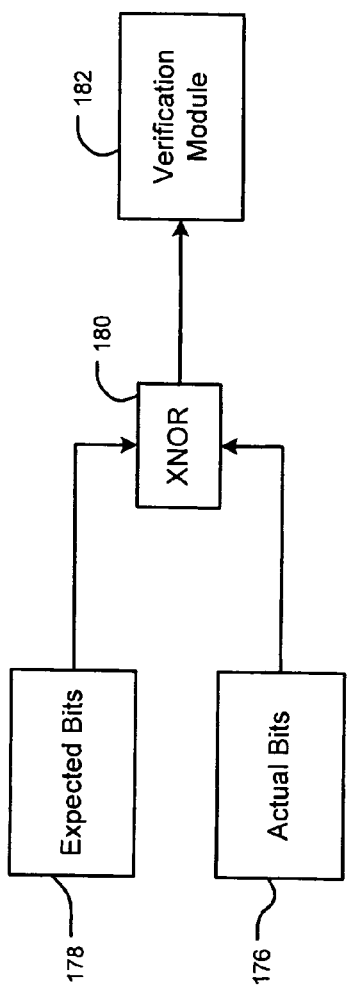
FIG. 8 is a functional block diagram of an exemplary embodiment of a pulse jitter detect module in the sync finder module of FIGS. 7A and 7B.
Figure 9:
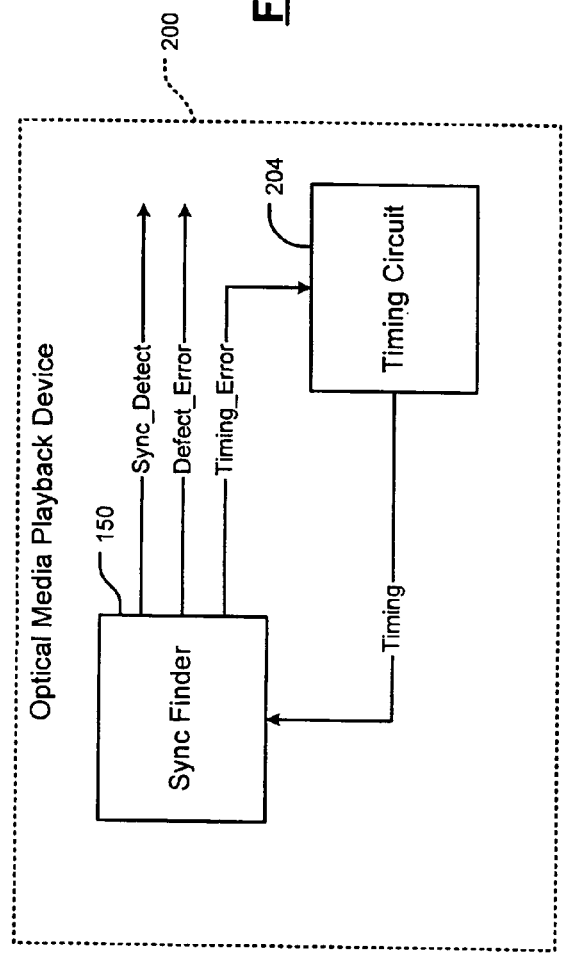
FIG. 9 is a functional block diagram of an exemplary optical playback device with a sync finder module that interfaces with a timing circuit.

Referring now to FIG. 8, a functional block diagram of the pulse jitter detector module 152 in the sync finder module 150 of FIGS. 7A and 7B is shown in further detail. The pulse jitter detecting module 152 compares actual received bits 176 to expected bits 178 using an XNOR gate 180. A verification module 182 receives the output of the XNOR gate 180 and generates the edge match/mismatch signal. The following table lists possible results:

| Expected Bits | Actual Bits | Result Bits | Programmed to: [No Slip] | Programmed to: [Allow one bit slip] |
|---|---|---|---|---|
| 010 | 000 | 101 | 0 | 0 |
| 010 | 001 | 100 | 0 | 1 |
| 010 | 010 | 111 | 1 | 1 |
| 010 | 011 | 110 | 0 | 0 |
| 010 | 100 | 001 | 0 | 1 |
| 010 | 101 | 000 | 0 | 0 |
| 010 | 110 | 011 | 0 | 0 |
| 010 | 111 | 010 | 0 | 0 |

As can be appreciated, the expected bits of each pulse jitter detector module can be programmable to check for pulse slip/jitter, so that defect sync patterns could be statistically analyzed with a known expected pattern. In other words, multiple expected bit combinations can be checked. For example, expected bit values of 100 and 010 can be checked. Alternately, 001 and 010 or 100, 010 and 001 can also be checked. Still other variations can be accommodated.

Figure 10:
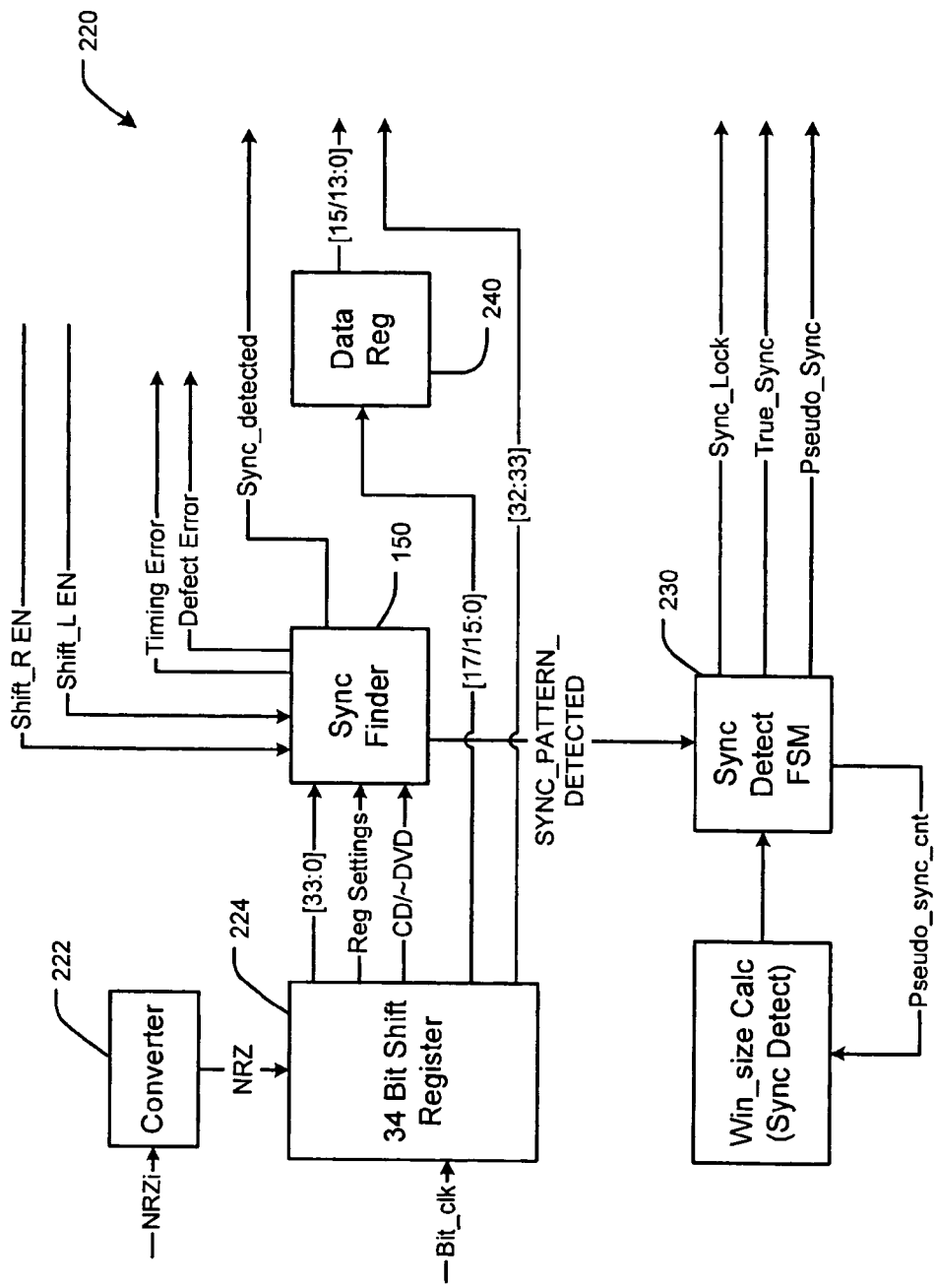
FIG. 10 is a functional block diagram of the sync finder module implemented in an exemplary embodiment of a sync module.

Referring now to FIG. 10, an optical media playback device 200 is shown to include the sync finder module 150 and a timing module 204 that generates a timing signal that is used by the sync finder module 150 and/or other modules within the optical media playback device 200. The timing error signal that is generated by the sync finder module 150 can be used in some embodiments to adjust a timing loop of the timing module 204. The sync finder may receive shift_left EN and/or shift_right EN signals to enable programmable left and/or right shifts of one or more of the pulse jitter detection modules.

Referring now to FIG. 10, a functional block diagram of the sync finder module 150 that is implemented in an exemplary sync module 220 is shown. A converter 222 converts NRZI converted signals to NRZ converted signals. The sync finder module 150 includes a multi-bit shift register 224 that receives the NRZ converted signal and a bit_clk or timing signal. The shift register 224 outputs the bits in the register to the sync finder module 150 along with two previously discussed programmable reg_setting signals and a CD/~DVD signal (that identifies whether the medium is CD or DVD) to the sync finder module 150. The sync finder module 150 generates the sync_pattern_detect signals.

The sync_pattern_detected signal is output to a sync detect finite state machine (FSM) 230. The sync detect FSM (230) generates sync-lock, true_sync and pseudo_sync signals. A data register 240 receives buffered data bits from the shift register 224. Other details of the sync module 220 may be found in the ECMA standards set forth above.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A sync finder module for an optical medium playback device that generates a bit stream including sync patterns and data blocks, comprising:
   a pulse jitter detect module that receives said sync pattern, which includes a plurality of transitions each having a desired position in said sync pattern, that selects actual N-bit segments of said sync pattern at said desired positions and that compares said actual N-bit segments to expected N-bit segments; and
   a pulse verifying module that communicates with said pulse jitter detect module and that generates a verified signal if said expected N-bit segments match said actual N-bit segments.

2. The sync finder module of claim 1 wherein N is greater than one.

3. The sync finder module of claim 1 wherein said sync finder module verifies said sync pattern based in part on said verified signal.

4. The sync finder module of claim 1 wherein said pulse jitter detect module generates a second signal when remaining ones of said bits in said sync pattern are not transitions.

5. The sync finder module of claim 4 wherein said sync finder module verifies said sync pattern of said bit stream when said verified signal and said second signal have a first state.

6. The sync finder module of claim 1 wherein N is equal to 3.

7. The sync finder module of claim 1 wherein said at least one expected N-bit segment is programmable.

8. The sync finder module of claim 6 wherein said at least one expected N-bit segment is equal to 010.

9. The sync finder module of claim 1 wherein said bit stream is in nonreturn to zero converted (NRZ) format.

10. The sync finder module of claim 1 wherein said pulse jitter detect module generates a timing error signal based on said comparison.

11. A system comprising the sync finder module of claim 10 and further comprising a timing module that generates a timing signal for said sync finder module, wherein said timing module alters said timing signal based on said timing error signal.

12. The sync finder module of claim 1 wherein said pulse jitter detect module generates a defect signal based on said comparison.

13. An optical media playback device comprising said sync finder module of claim 1.

14. A sync finder module for an optical medium playback device that generates a bit stream including sync patterns and data blocks, comprising:
    pulse jitter detect means for receiving said sync pattern, which includes a plurality of transitions each having a desired position in said sync pattern, for selecting actual N-bit segments of said sync pattern at said desired positions and for comparing said actual N-bit segments to expected N-bit segments; and
    pulse verifying means that communicates with said pulse jitter detect means for generating a verified signal if said expected N-bit segments match said actual N-bit segments.

15. The sync finder module of claim 14 wherein N is greater than one.

16. The sync finder module of claim 14 wherein said sync finder means verifies said sync pattern based in part on said verified signal.

17. The sync finder module of claim 14 wherein said pulse jitter detect means generates a second signal when remaining ones of said bits in said sync pattern are not transitions.

18. The sync finder module of claim 17 wherein said sync finder means verifies said sync pattern of said bit stream when said verified signal and said second signal have a first state.

19. The sync finder module of claim 14 wherein N is equal to 3.

20. The sync finder module of claim 14 wherein said at least one expected N-bit segment is programmable.

21. The sync finder module of claim 19 wherein said at least one expected N-bit segment is equal to 010.

22. The sync finder module of claim 14 wherein said bit stream is in nonreturn to zero converted (NRZ) format.

23. The sync finder module of claim 14 wherein said pulse jitter detect means generates a timing error signal based on said comparison.

24. A system comprising the sync finder module of claim 23 and further comprising timing means for generating a timing signal for said sync finder means, wherein said timing means alters said timing signal based on said timing error signal.

25. The sync finder module of claim 14 wherein said pulse jitter detect means generates a defect signal based on said comparison.

26. An optical media playback device comprising said sync finder module of claim 14.

27. A method for identifying sync marks for an optical medium playback device that generates a bit stream including sync patterns and data blocks, comprising:
    receiving said sync pattern, which includes a plurality of transitions each having a desired position in said sync pattern;
    selecting actual N-bit segments of said sync pattern at said desired positions;
    comparing said actual N-bit segments to expected N-bit segments; and
    generating a verified signal if said expected N-bit segments match said actual N-bit segments.

28. The method of claim 27 wherein N is greater than one.

29. The method of claim 27 further comprising verifying said sync pattern based in part on said verified signal.

30. The method of claim 27 further comprising generating a second signal when remaining ones of said bits in said sync pattern are not transitions.

31. The method of claim 30 further comprising verifying said sync pattern of said bit stream when said verified signal and said second signal have a first state.

32. The method of claim 27 wherein N is equal to 3.

33. The method of claim 27 wherein said at least one expected N-bit segment is programmable.

34. The method of claim 32 wherein said at least one expected N-bit segment is equal to 010.

35. The method of claim 27 wherein said bit stream is in nonreturn to zero converted (NRZ) format.

36. The method of claim 27 further comprising generating a timing error signal based on said comparison.

37. The method of claim 36 further comprising:
    generating a timing signal; and
    altering said timing signal based on said timing error signal.

38. The method of claim 37 further comprising generating a defect signal based on said comparison.

* * * * *